(12) United States Patent
Yamazaki et al.

(10) Patent No.: US 8,360,473 B2
(45) Date of Patent: Jan. 29, 2013

(54) LUGGAGE SUPPORT HOOK FOR A SCOOTER-TYPE MOTORCYCLE, AND MOTORCYCLE INCORPORATING SAME

(75) Inventors: Takayuki Yamazaki, Saitama (JP); Takehiro Ishikawa, Saitama (JP); Yu Miyajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 12/869,146

(22) Filed: Aug. 26, 2010

(65) Prior Publication Data

US 2011/0057431 A1  Mar. 10, 2011

(30) Foreign Application Priority Data

Sep. 10, 2009  (JP) .................. 2009-209758

(51) Int. Cl.
*B62J 7/06* (2006.01)
(52) U.S. Cl. ......... 280/769; 224/413; 248/304; 248/305
(58) Field of Classification Search .................. 224/412, 224/413; 248/304, 305; 280/769
See application file for complete search history.

(56) References Cited

U.S. PATENT DOCUMENTS

| 1,651,969 A | 12/1927 | Saxton |
| 3,424,418 A | 1/1969 | Freedman et al. |
| 6,913,286 B2 * | 7/2005 | Kramer ..................... 280/762 |

FOREIGN PATENT DOCUMENTS

| JP | 08-230739 A | 9/1996 |
| JP | 10016849 A | 1/1998 |
| JP | 3633114 B2 | 1/2005 |

* cited by examiner

*Primary Examiner* — Jeffrey J Restifo
*Assistant Examiner* — Erez Gurari
(74) *Attorney, Agent, or Firm* — Carrier Blackman & Associates, P.C.; William D. Blackman; Joseph P. Carrier

(57) ABSTRACT

A luggage support hook is attached to a center tunnel immediately above a storage unit, which is provided at a rear portion of a leg shield of a saddle-type vehicle, in order to provide a degree of freedom in a manner of hooking a hanging strap of an article to be hung on the luggage support hook, and to retain luggage in a stable state during travel. The luggage support hook is formed in a substantially Y-shape, when viewed from a front side, by a base member attached to a recess portion, a plurality of first arms projecting radially from a rear end of the base member, and a second arm member projecting from a position of the rear end of the base member. The second arm member is different from the first arms.

19 Claims, 9 Drawing Sheets

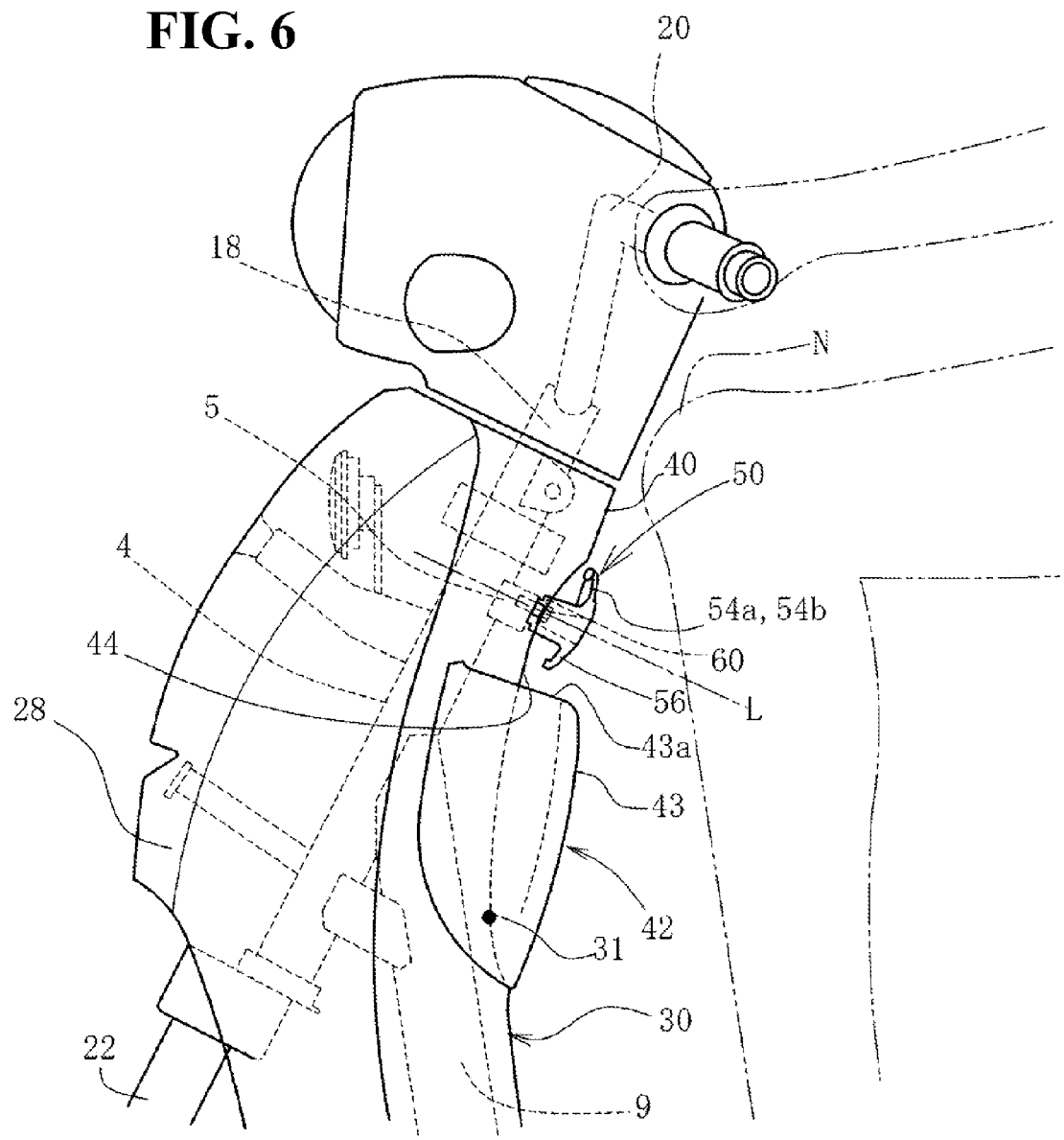

FIG. 8A
FIG. 8B
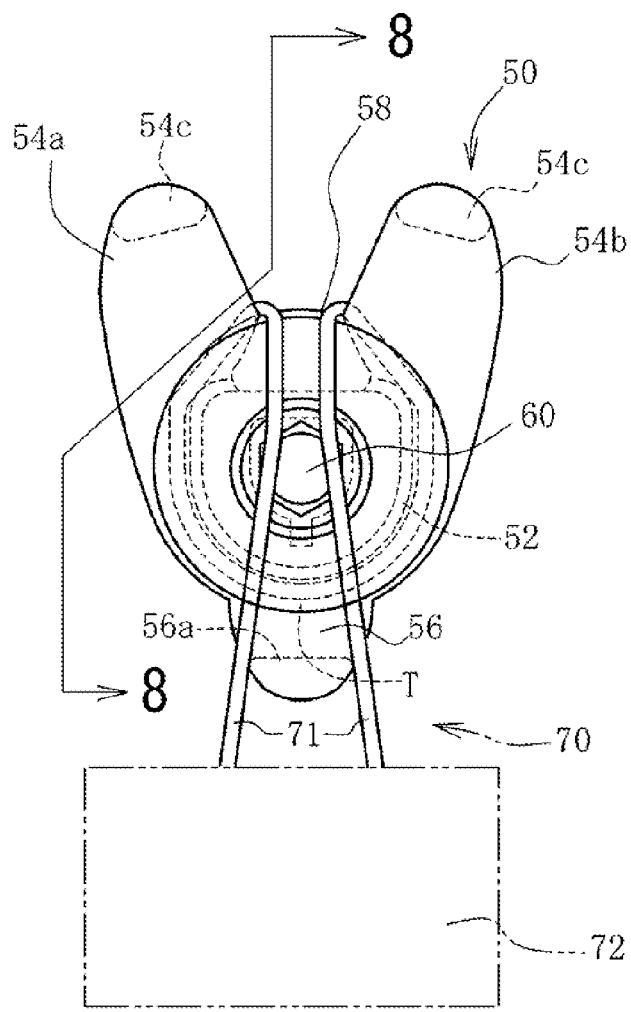
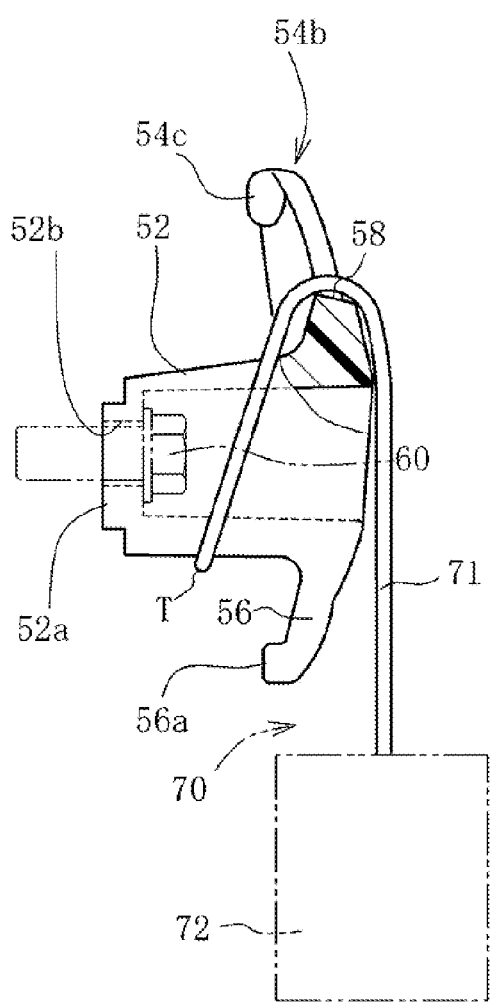

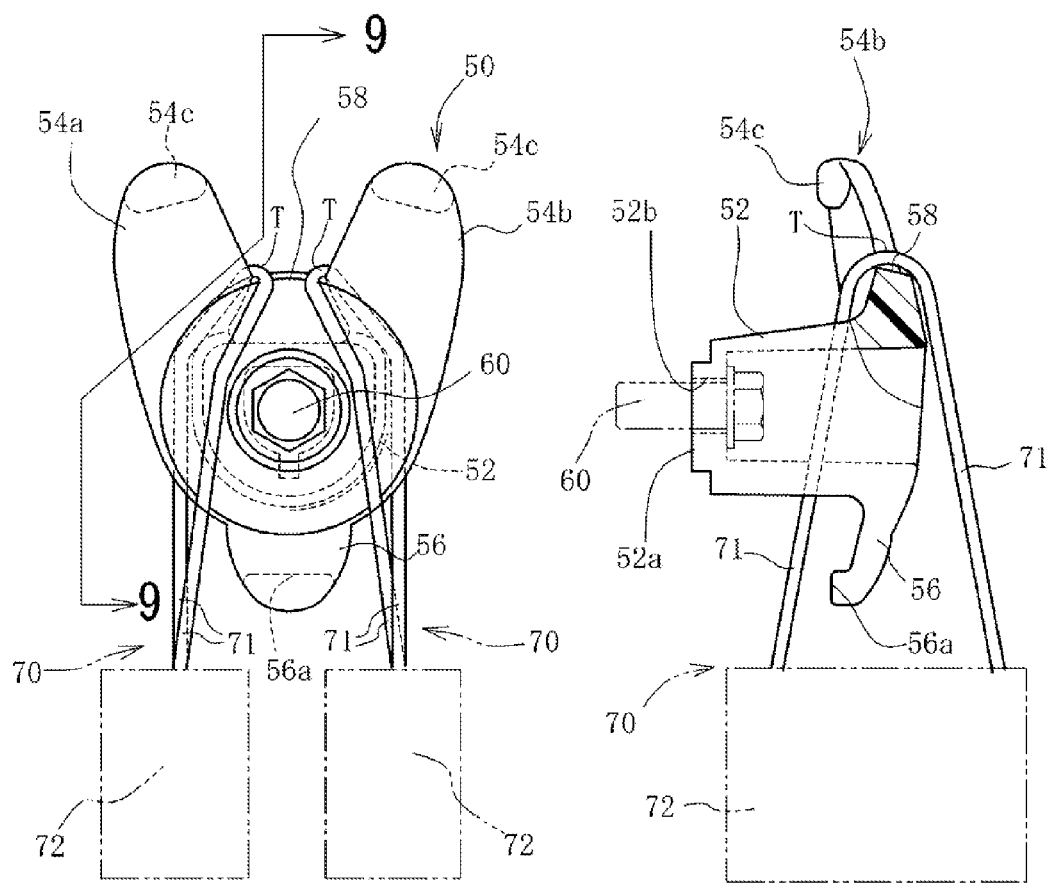

LUGGAGE SUPPORT HOOK FOR A SCOOTER-TYPE MOTORCYCLE, AND MOTORCYCLE INCORPORATING SAME

CROSS-REFERENCE TO RELATED APPLICATIONS

The present invention claims priority under 35 USC 119 based on Japanese patent application No. 2009-209758, filed on Sep. 10, 2009. The entire subject matter of this priority document, including specification claims and drawings thereof, is incorporated by reference herein.

BACKGROUND OF THE INVENTION

1. Field of the Invention

The present invention relates to a luggage support hook provided on a scooter-type motorcycle, proximate a leg shield thereof, and to a motorcycle incorporating the described luggage support hook. More particularly, the present invention relates to a luggage support hook formed in a substantially Y-shape, which is arranged proximate a leg shield of a motorcycle, and to a motorcycle incorporating the same.

2. Description of the Background Art

There is a known motorcycle having a leg shield for covering an occupant's legs, wherein a luggage support hook is provided at a center of an upper portion of the leg shield and a storage unit (having an upward opening) is arranged below the luggage support hook.

An example of such luggage support hook for a motorcycle is disclosed in the Japanese Patent No. 3633114.

According to the JP 3633114, the luggage support hook or the storage unit is used in such a manner that an article to be hung, such as a bag or a shopping bag, is hung on the luggage support hook, or the article is put in the storage unit, or a body portion of the article hung on the luggage support hook is put in the storage unit and stably supported. Moreover, in some cases, the article to be supported is hung on the luggage support hook, and at the same time, the body portion of the article to be supported is put on a floor portion of the motorcycle, on which occupant's feet are also put, during operation of the vehicle.

The known luggage support hook for the scooter-type motorcycle, as disclosed in the JP Patent No. 3633114, exhibits a substantially L-shape configuration. A hanging strap of the article to be hung is merely hooked to the luggage support hook, so that when the article to be hung is large-sized or the hanging strap is too long, the article to be hung is brought to a state where it is carried on the floor portion of the motorcycle, and looseness is produced in the hanging strap. Therefore, there is a possibility that, during travel, the hanging strap is disconnected from the luggage support hook or the article on the floor portion is rolled and may become unstable.

Moreover, even if an attaching position of the luggage support hook is merely made higher or the hanging strap is merely shortened, there is a possibility that, during travel, the article to be hung becomes easy to swing about the luggage support hook depending upon hung state thereof, so that it is desired that the length of the hanging strap is suitably adjusted and the article is made stable even during operation of the motorcycle.

The present invention is therefore made in consideration of such circumferences. Accordingly, it is one of the objects of the present invention to provide a luggage support hook for a motorcycle, in which a degree of freedom in the manner of hooking a hanging strap of an article to be hung, to the luggage support hook can be ensured, and the article can also be retained in a stable state during operation of the motorcycle.

SUMMARY OF THE INVENTION

In order to achieve the above objects, the present invention according to a first aspect thereof provides a luggage support hook for a vehicle. The luggage support hook is attached to a vehicle body. The luggage support hook includes a substantially cylindrical base member attached to the vehicle body, a first arm member projecting radially from the base member (base portion), and a second arm member projecting radially from the base member at a position different from the first arm member.

The present invention according to a second aspect thereof, in addition to the first aspect, is characterized in that the second arm member is configured so as to project from a rear end of the base member in an opposite direction to the first arm member.

The present invention according to a third aspect thereof, in addition to the second aspect, is characterized in that the first arm member and the second arm member are configured so as to project in upward and downward directions, respectively.

The present invention according to a fourth aspect thereof, in addition to the third aspect, is characterized in that the first arm member includes a plurality of upward projecting arms, and that the second arm member is configured to project downward.

The present invention according to a fifth aspect thereof, in addition to the fourth aspect, is characterized in that the vehicle body includes a leg shield having a wall portion and a floor portion provided below the wall portion, and that the base member of the luggage support hook is attached to the wall portion extending substantially vertically.

The present invention according to a sixth aspect thereof, in addition to one of the third, fourth and fifth aspects, is characterized in that the vehicle body includes a seat on which a rider sits and a leg shield arranged forward of legs of the rider in front of the seat, and a storage unit (having an upward opening) is formed on a rear surface of the leg shield below the luggage support hook.

The present invention according to a seventh aspect thereof, in addition to the sixth aspect, is characterized in that the first arm member includes a plurality of upward projecting arms, and a branch portion formed between the plurality of arms is positioned rearward of an rear wall of the storage unit.

The present invention according to a eighth aspect thereof, in addition to one of the sixth and seventh aspects, is characterized in that the second arm member is projected downward from the base member, and a lower end portion of the second arm member is positioned forward of rear end edge of the rear wall of the storage unit.

The present invention according to a ninth aspect thereof, in addition to the eighth aspect, is characterized in that rear wall of the storage unit is formed so as to face in a rearward and upward direction, and the second arm member is formed so as to project in a forward and downward direction from the base member.

The present invention according to a tenth aspect thereof, in addition to the fifth aspect, is characterized in that the first arm member includes two arms which project in a branch-shape in upward and left and right directions from a rear end of the base member attached to an upper portion of a tunnel portion, and are symmetric in a left and right direction.

Advantages of the Inventive Embodiments

According to the first aspect of the present invention, the luggage support hook is configured from the first arm member projecting radially from the rear end of the base member, and the second arm member projecting radially from the position different from the first arm member, whereby it is possible to increase and decrease the number of winding of a hanging strap of an article to be hung, around the plurality of the arm portions of the luggage support hook as the hooking manner, when the hanging strap of the article to be hung are hooked to the luggage support hook. Thereby, a length of the hanging strap can be easily adjusted to a suitable length.

According to the second aspect of the present invention, the second arm member is configured so as to project from the rear end of the base member in the opposite direction to the first arm member, whereby according to an angle relative to the base member which is formed in a radial direction between the first arm member and the second arm member, the arm portions around which the hanging strap is to be twined can be suitably selected.

Thus, after the hanging strap is hooked to the selected arm portion, the hanging strap is folded back several times according to the number of the arm portions around which the hanging strap is twined, to thereby make it possible to easily adjust the length of the hanging strap. In this way, the arm portions around which the hanging strap is twined are selected, thus ensuring a degree of freedom in the hooking manner.

According to the third aspect of the present invention, the first arm member and the second arm member are configured so as to project in the upward and downward directions, whereby the hanging strap can be not only hooked to the arm portion facing at least upward, but also the arm portion facing downward. Thereby, if after a middle portion of the hanging strap is hooked to any of the arm portions, two portions of the hanging strap which extend to both sides are twined around the upper and lower arm portions in a state where the two portions are put together, the length can be adjusted according to the number of twining.

According to the fourth aspect of the present invention, the arm portion of the luggage support hook is configured from the first arm member including the plurality of the upward projecting arms, and the second downward projecting arm portion. Thereby, if the middle portion of the hanging strap is wound around an outer periphery of the base member of the luggage support hook from a downward direction and the two portions of the base member which extend to the both sides are put together and passed through a branch portion between the plurality of the arms, the two hanging straps are tightened. If the article to be hung is hung in this manner, the load of the article to be hung is exerted downward, so that the article to be hung can be hooked in a reliable and stable state.

According to the fifth aspect of the present invention, the floor portion is provided below the luggage support hook, so that the hanging strap can be adjusted so as not to produce looseness in the luggage support hook and the hooked article to be hung can be carried on the floor portion, and thus the article to be hung can be stably retained.

According to the sixth aspect of the present invention, the storage unit (having an upward opening) is provided below the luggage support hook of the leg shield, so that the article to be hung can be housed in the storage unit in a state where the hanging strap is hooked to the luggage support hook, and thus the article to be hung can be stably retained.

According to the seventh aspect of the present invention, the branch portion of the first arm member which is formed between the plurality of the arms is positioned rearward of the rear wall of the storage unit. Therefore, the hanging strap which is hooked to the plurality of the arms of the first arm member is passed through the branch portion to hang the article to be hung, whereby interference with the storage unit can be prevented.

According to the eighth aspect of the present invention, the lower end portion of the second arm member projecting downward from the base member is positioned forward of the opening rear end edge of the storage unit. Hence, the opening portion of the storage unit can be widely used, and thus taking of the article to be hung in and out of the storage unit is not prevented.

According to the ninth aspect of the present invention, the rear wall of the storage unit is formed so as to face in the rearward and upward direction, and the second arm member projects in the forward and downward direction from the base member. Thereby, the function of taking of the article to be hung in and out of the storage unit can be more improved.

According to the tenth aspect of the present invention, the base member is positioned above the floor tunnel which is provided in a forward and rearward direction on a center of the floor portion so as to be bulged upward, and the first arm member is configured from the arms which project in the branch-shape from the rear end of the base member in a left/right and upward direction and symmetric in the left and right direction. Thereby, two articles to be hung are respectively hooked to the arms which project in the branch-shape and symmetric in the left and right direction, whereby the articles to be hung escape from the floor tunnel, are separated on both the sides, and can be hung on the hook with good balancing properties.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 6 is a side plan view, partially in phantom, and illustrating a relationship among the storage unit, the luggage support hook, and a driver's legs during operation of the motorcycle.

FIG. 8A is a front view illustrating a manner by which a hanging strap of an article to be hung is hooked to the luggage support hook.

FIG. 8B is an explanatory side view, partially in cross section, taken along a line 8-8 of FIG. 8A.

FIG. 9A is a front view illustrating another manner by which the hanging strap of the article to be hung is hooked to the luggage support hook.

FIG. 9B is an explanatory side view, partially in cross section, taken along a line 9-9 of FIG. 9A.

DETAILED DESCRIPTION OF ILLUSTRATIVE EMBODIMENTS

Descriptions will be provided below of selected illustrative embodiments of the present invention on a basis of examples of the present invention, supported by and shown in the accompanying drawings. It should be understood that only structures considered necessary for clarifying the present invention are described herein. Other conventional structures, and those of ancillary and auxiliary components of the system, will be known and understood by those skilled in the art. In the following detailed description, relative positional terms such as "front", "rear", "right side" and "left side" correspond to those directions considered from the vantage point of a vehicle operator, seated in the driver's seat and facing forwardly.

Figure 1:
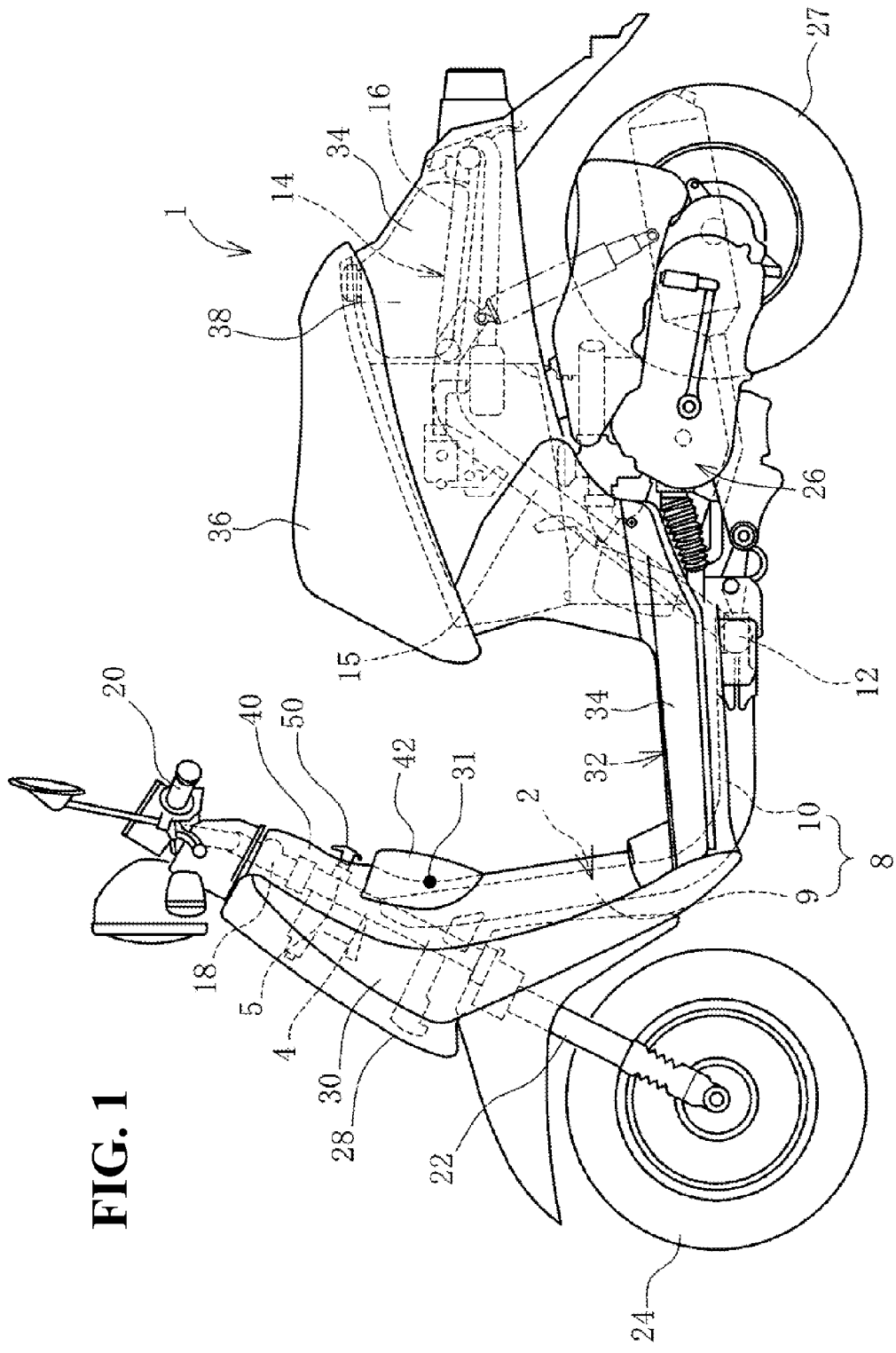
FIG. 1 is a side view of a scooter-type motorcycle having a luggage support hook according to an illustrative embodiment of the present invention.

FIG. 1 is a side view of the motorcycle according to the embodiment of the present invention. As shown in FIG. 1, a vehicle body frame 2 of the scooter-type motorcycle 1 includes a main frame 8, a head pipe 4 is fixed to a front end of the main frame 8, a cross pipe 12 having a middle portion fixed thereof at a right angle to a rear end of the main frame 8 in a horizontal plane, and a pair of left and right rear frames 14 which are made of pipe members and which are continuously connected at front ends thereof to both end portions of the cross pipe 12.

The main frame 8 includes a down frame portion 9 descendingly inclined rearward from the head pipe 4, and a floor frame portion 10 bent substantially horizontally from a rear end of the down frame portion 9 and extending rearward. The down frame portion 9 and the floor frame portion 10 of the main frame 8 are continuously formed together.

The pair of left and right rear frames 14 include front portions 15 ascendingly extending obliquely rearward from both the end portions of the cross pipe 12, and rear portions 16 bent substantially horizontally from rear ends of the front portions 15, extending rearward, and curved in a horizontal plane in such a manner that openings of rear end portions thereof face toward each other. The front portions 15 and the rear portions 16 of the each of the left and right rear frames 14 are continuously formed together.

A stem pipe 18 is rotatably supported on the head pipe 4 and rotated by a handlebar 20. An upper end of the stem pipe 18 is connected to the handlebar 20. A pair of left and right front forks 22 is connected to a lower end of the stem pipe 18. A front wheel 24 is supported between lower portions of the left and right front forks 22.

A power unit 26 is swingably supported on the cross pipe 12. A rear wheel 27 is supported on a rear portion of the power unit 26. The power unit 26 includes a four-cycle engine and a V-belt continuously variable transmission, which are integrated.

The head pipe 4 is covered from a front side by a front cover 28 and covered from a rear side by a leg shield 30. The leg shield 30 is a member covering rider's legs in front thereof, exhibits a substantially L-shape as viewed from a side in an illustrated state, and exhibits a forwardly and projectively bent portion 31 at a middle portion thereof in an upward/downward direction. A lower end portion of the leg shield 30 is connected to a front end region of a floor portion 32. The floor portion 32 is supported on the floor frame portion 10 of the main frame 8 and provided with a floor tunnel portion 34 at a center portion thereof in a vehicle width direction. The floor tunnel portion 34 is bulged upward and formed in a forward/rearward direction, in order to escape from the floor frame portion 10.

A rear end region of the floor portion 32 is connected to a rear cover 38 covering a downward circumstance of a seat 36. The floor portion 32 is arranged in front of the seat 36. An occupant who sits on the seat 36 puts his/her feet in order on the floor portion 32.

A center tunnel 40 is also formed at a center portion of the leg shield 30 in the vehicle width direction so as to become a backbone-shape in the upward/downward direction. The center tunnel 40 is formed so as to bulge rearward in order to escape from the head pipe 4 and the down frame portion 9. Moreover, a storage unit 42 which opens upward is provided in the neighborhood of the bent portion 31 so as to project rearward.

A luggage support hook 50 is provided on the center tunnel 40 above the storage unit 42, and bolt-fastened to a boss 5 which is provided on the head pipe 4.

Next, referring to FIGS. 2-6, the storage unit 42 and the luggage support hook 50 will be explained.

The leg shield 30 includes a leg shield upper-portion 30a above the bent portion 31, which has a rearward inclined surface, and a leg shield lower-portion 30b below the bent portion 31, which exhibits a forward inclined surface (FIG. 6). The storage unit 42, which is provided to vertically straddle the bent portion 31, provides a storage space between a rear wall 43 inclined and projecting rearward, and a wall surface of the leg shield 30 by the rear wall 43. The luggage support hook 50 is arranged on the rearward inclined center tunnel 40 above the storage unit 42.

Therefore, an end portion of the luggage support hook 50 which projects rearward is inclined so as to be obliquely face downward, a lower end portion of the luggage support hook 50 is positioned above the storage unit 42, and an upper end portion of the luggage support hook 50 projects rearward of the storage unit 42 (FIG. 6) and is positioned above the floor portion 32 (FIG. 1).

Additionally, the luggage support hook 50 is provided in a recess portion 44 which is provided in the center tunnel 40. Therefore, the luggage support hook 50 can be arranged so as to be placed as near as possible to the front portion of a vehicle body such that during operation of the motorcycle, the luggage support hook 50 does not come in contact the knees N of the occupant and a comfortable riding space can be obtained.

Figure 2:
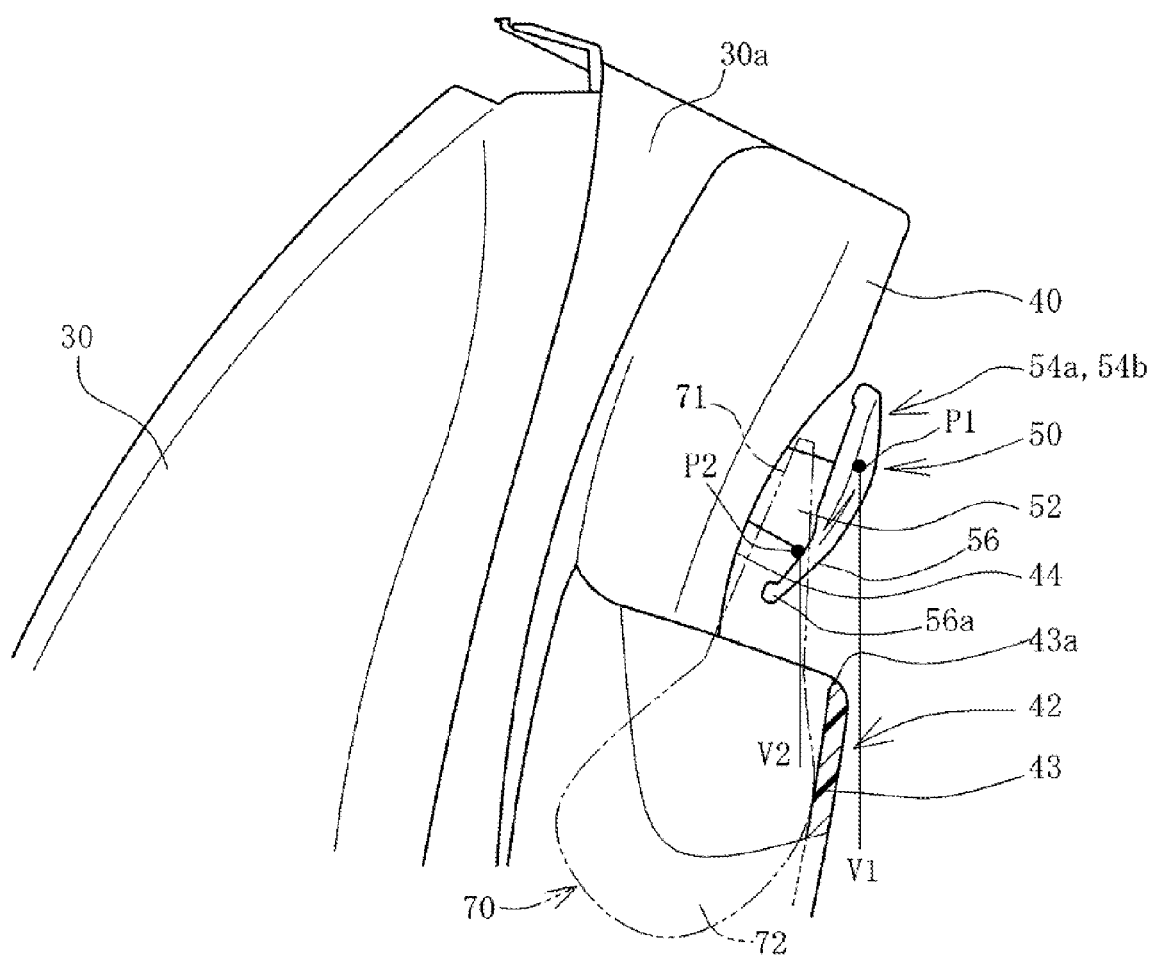
FIG. 2 is a partially enlarged side view illustrating a relationship between a storage unit and the luggage support hook of the scooter-type motorcycle according to the present invention.

In addition, the recess portion 44 is projectively curved forward when viewed from the side, and faces downward and obliquely downward, so that if the luggage support hook is provided at an upper portion of the concave portion having steep inclination, the luggage support hook 50 can be more greatly inclined (FIGS. 2 and 6). Accordingly, when the luggage support hook 50 is fastened to the boss 5 by a bolt 60, a fastening line L becomes an obliquely ascending inclination line (FIG. 6). The fastening line L also depicts a longitudinal axis of the cylindrical base member 52.

Moreover, the storage unit 42 is also provided so as to straddle the bent portion 31 which exits at the most forward location in the leg shield 30, so that even if a volume of the storage unit is relatively increased, it can be arranged so as not to contact the knees N and the legs of a person operating the vehicle.

As shown in FIG. 2, the storage unit 42 which is provided at the leg shield upper-portion 30a of the leg shield 30 opens upward. An opening rear end edge 43a of the rear wall 43 which faces such opening is positioned below the luggage support hook 50.

As will be described herein below, the luggage support hook 50 includes a base member 52, two first arms 54a, 54b, and a second arm member 56. The base member 52 may be a cylindrical unit. A perpendicular line (a vertical line) V1 which passes through a point P1 corresponding to a fork portion (described below) of the first arms 54a, 54b passes behind the rear wall 43 and rear end edge 43a of the rear wall 43.

On the other hand, a perpendicular line (a vertical line) V2 which passes through a connection portion P2 between the second arm member 56 and the base member 52 passes forward of the opening rear end edge 43a and the rear wall 43, that is, the storage space of the storage unit 42. Accordingly, a body portion 72 of an article 70 to be hung can be housed in the storage unit 42 in a state where a hanging strap 71 of the article 70 to be hung is hooked to the luggage support hook 50, so that the article to be hung can be stably retained.

If the hanging strap 71 is hung down along the perpendicular line V1, the hanging strap 71 can be adjusted so as not to produce looseness in the luggage support hook 50 and the body portion 72 of the hooked article can be hung can be carried on the floor portion 32, since the floor portion 32 is provided below the luggage support hook 50, so that the article to be hung can be stably retained.

Moreover, if the hanging strap 71 is hooked along the perpendicular line V2, the article 70 to be hung can be housed in the storage unit 42 since the storage unit 42 opening upward is provided below the second arm member 56, so that the article to be hung can be stably retained.

In addition, a lower end region 56a of the second arm member 56 which is provided so as to project downward from the base member 52 is positioned forward of the opening rear end edge 43a of the storage unit 42, so that the opening portion of the storage unit 42 is adapted to be widely used, and selectively taking of the article 70 to be hung in and out of the storage unit 42 is easy.

Moreover, the rear wall 43 of the storage unit 42 is formed so as to face rearward and obliquely upward and the second arm member 56 is provided so as to project in the forward and downward direction and obliquely descend from the base member 52. Therefore, the function of taking the article 70 to be hung in and out of the storage unit 42 is further improved.

Figure 3:
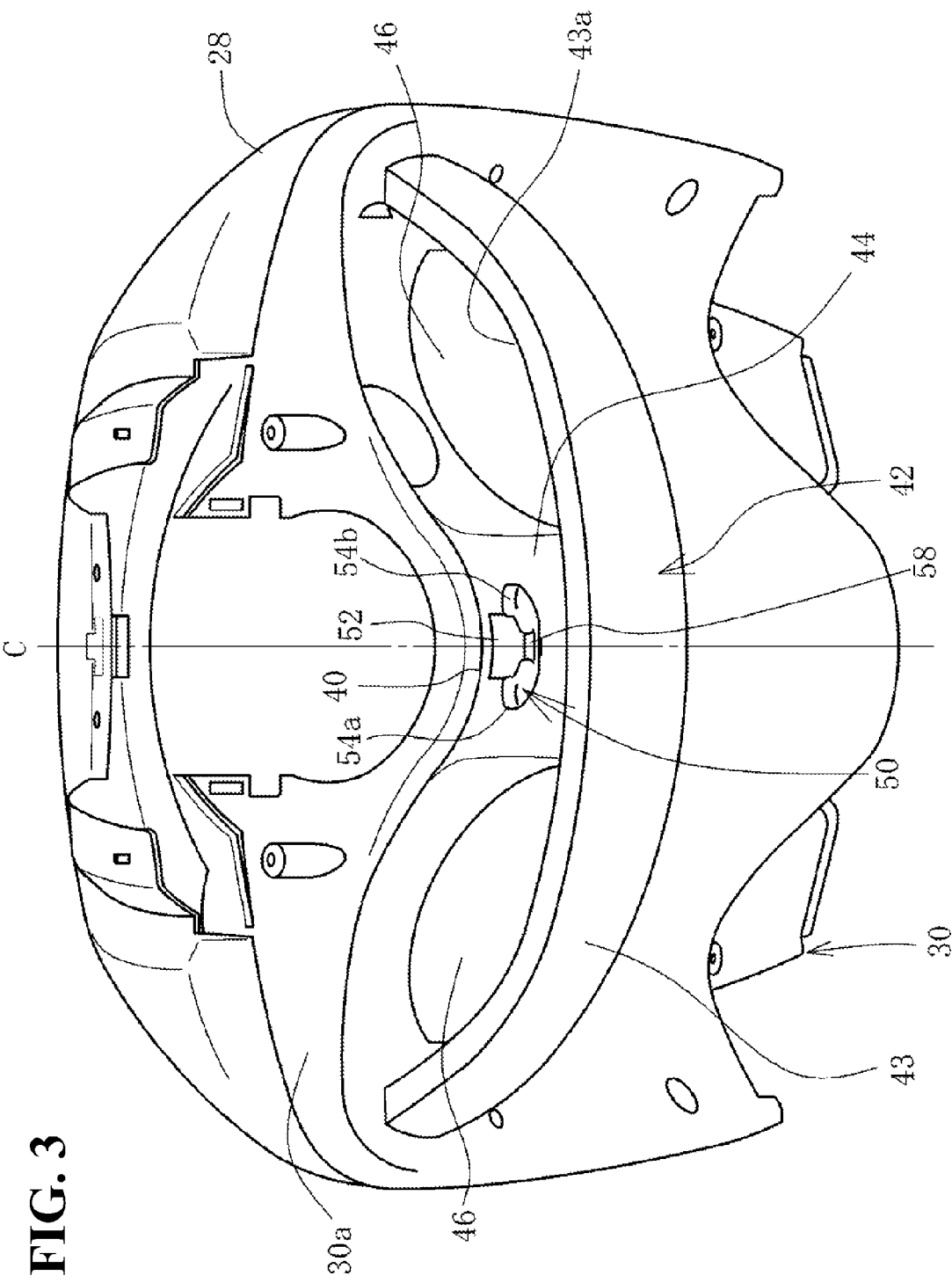
FIG. 3 is a partial plane view illustrating a relationship between the storage unit and the luggage support hook.

As shown in FIG. 3, the center tunnel 40 is provided vertically along a vehicle body center C in the vehicle width direction and the luggage support hook 50 is also positioned on the vehicle body center C. Left and right portions of the center tunnel 40 in the leg shield upper-portion 30a exhibit recess portions 46 which are recessed forward. The provision of the recess portions 46 allows the volume in the storage unit 42 to be increased.

Figure 4:
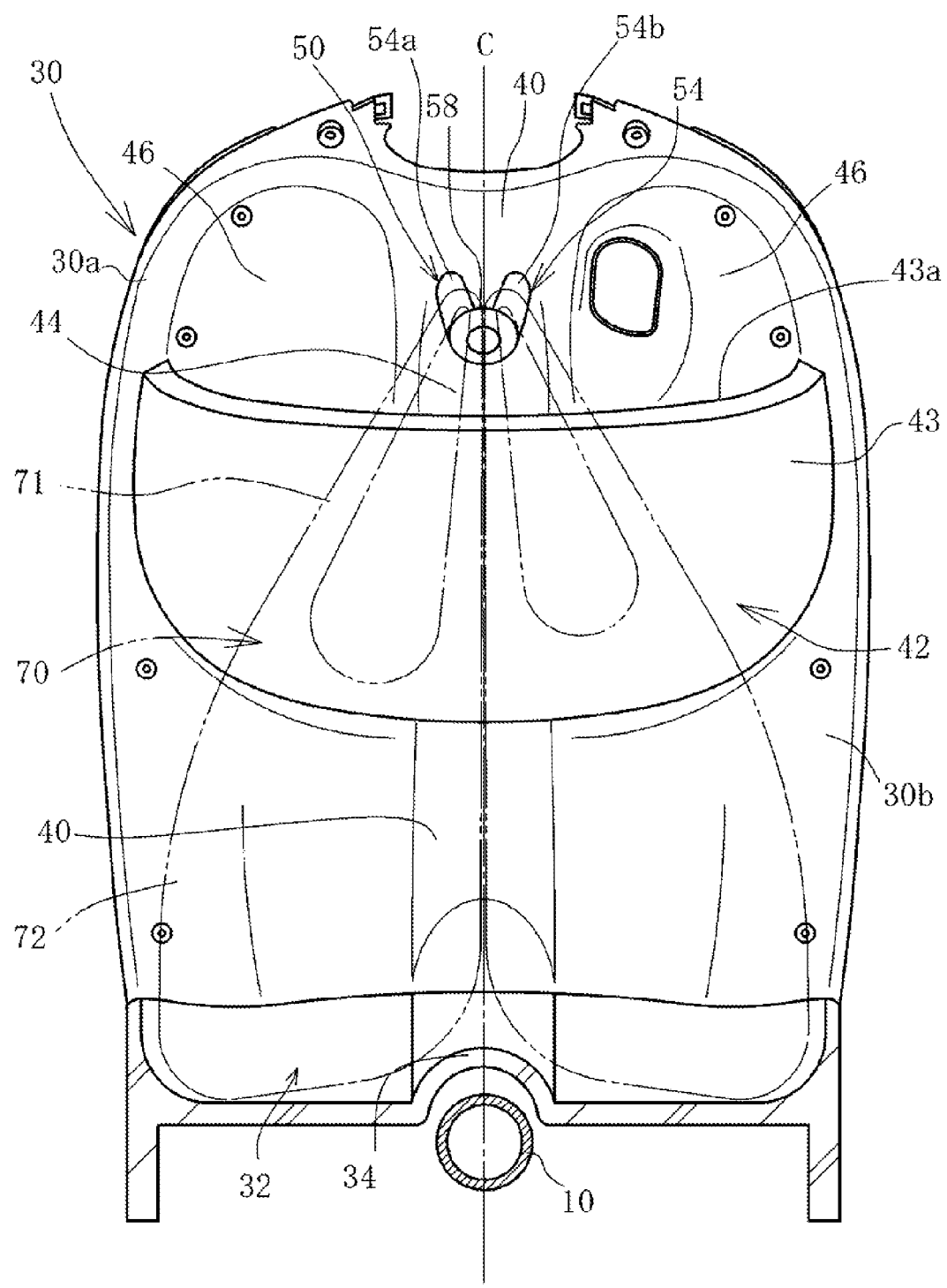
FIG. 4 is a rear view of a leg shield and a floor portion.
Figure 5:
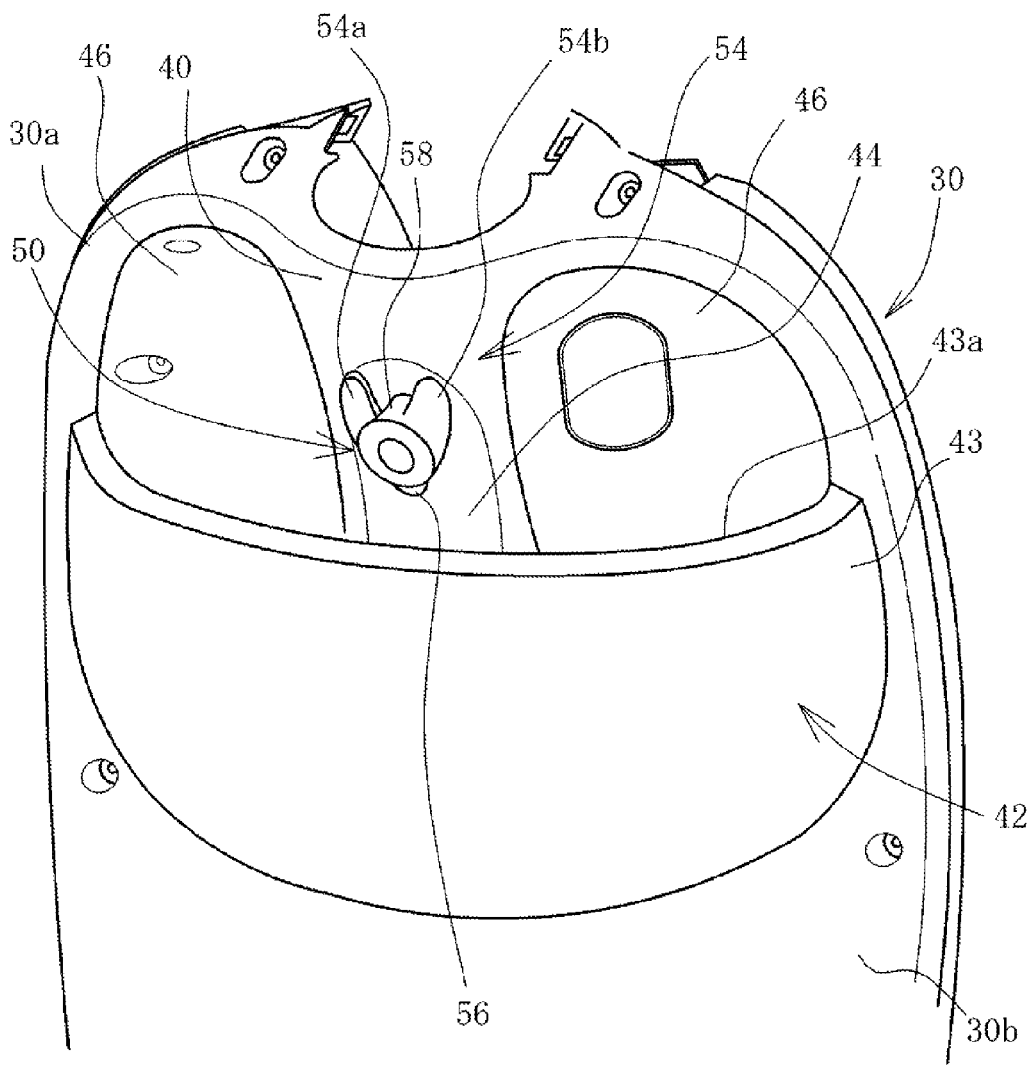
FIG. 5 is a partial perspective view illustrating a relationship between the storage unit and the luggage support hook.

As shown FIGS. 4 and 5, the rear wall 43 has a width in the left and right direction which is slightly narrower than a width of the leg shield 30 in the vehicle width direction. The rear wall straddles the center tunnel 40 in the left and right direction, is curved in such a manner that a center portion thereof in the vehicle width direction is most protruded rearward, overlapped on a rear surface of the leg shield 30 (a surface on the side of the rider), curved forward at left and right and lower end portions thereof, and attached to the leg shield 30, whereby the storage space opening upwardly is formed.

A lower end portion of the leg shield 30 is connected to a front end portion of the floor portion 32 (FIG. 4). At a center portion of the floor portion 32 in the vehicle width direction, the floor tunnel portion 34 which is connected to a lower end portion of the center tunnel 40 projects upward and is formed so as to be elongated in the forward and rearward direction.

As is apparent from FIG. 4, the first arms 54a, 54b of the first arm member 54 project in the left and right direction from the vehicle body center C. Left and right portions of the floor tunnel portion 34 in the floor portion 32, which interpose the vehicle body center C therebetween, are positioned below the first arms 54a, 54b. Therefore, when two articles 70, such as shopping bags, are prepared and hanging straps 71 thereof are separately hooked to the first left and right arms 54a, 54b, the two articles 70 to be hung are arranged separately from a location immediately above the center tunnel 40, and are supported so as to interpose the center tunnel 40 therebetween and so as to be separated in the left and right direction. The body portions 72 thereof are supported so as to be separated in the left and right direction of the floor tunnel portion 34.

As will be further described herein, lengths of the hanging straps 71 are suitably adjusted in advance for bringing the hanging straps 71 to a relatively tense state, whereby the articles to be hung can be stably supported even during travel. Additionally, the body portions 72 of the articles 70 to be hung may be supported from the floor tunnel portion 34 to a flat portion of the floor portion 32.

Figure 7B:
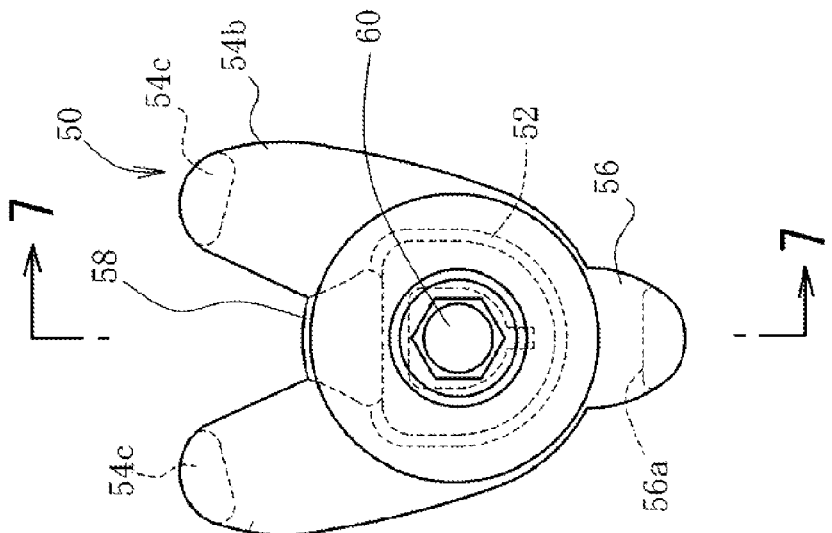
FIG. 7B is a front view illustrating a structure of the luggage support hook.
Figure 7C:
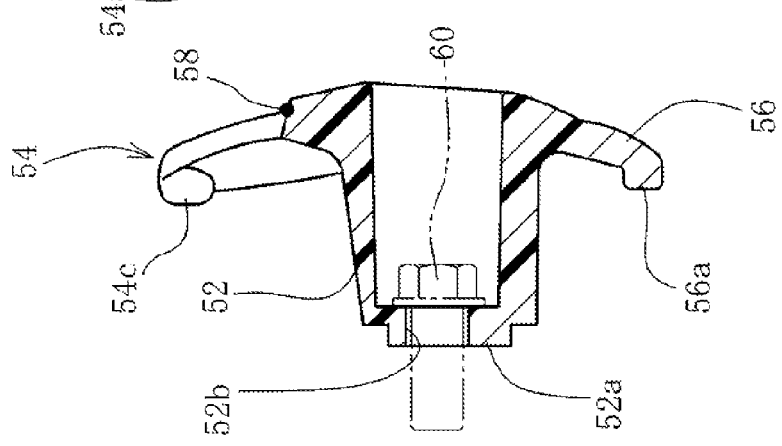
FIG. 7C is a sectional view taken along a line 7-7 in FIG. 7B.
Figure 7A:
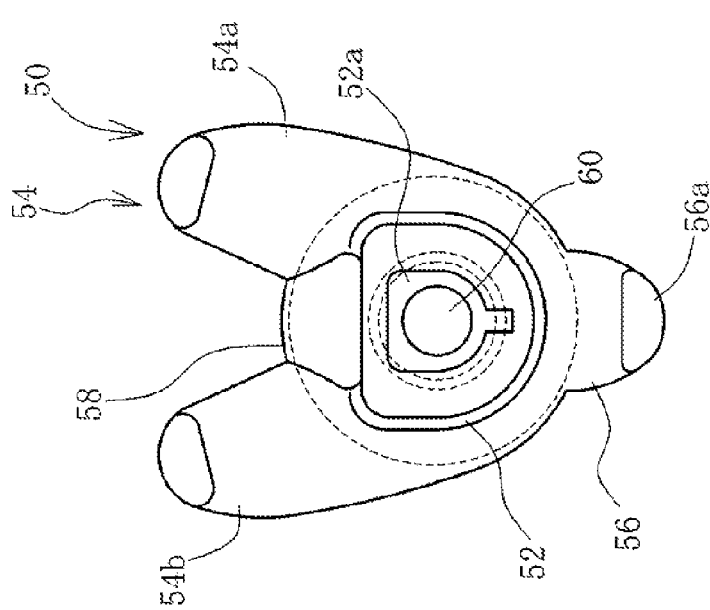
FIG. 7A is a rear view illustrating a structure of the luggage support hook.

Next, the structure of the luggage support hook will be explained in detail. FIG. 7A is a rear view of the luggage support hook 50. FIG. 7B is a front view of the luggage support hook 50. FIG. 7C is a sectional view taken along a line 7-7 in FIG. 7B. As shown in FIGS. 7A-7C, the luggage support hook 50 includes the boss-shaped base member 52 attached to a rear wall portion of the leg shield upper-portion 30a, a first arm member 54 in a fork-shape upward projecting in the left and right direction from a rear end of the base member 52, and the second arm member 56 projecting downward from the first arm member 54 at the rear end of the base member 52. The luggage support hook 50 exhibits a right Y-shape configuration, and is formed of any suitable synthetic resin. The base member 52 may be a cylindrical or square-shaped member.

The first arm member 54 in the branch-shape is provided with two arms including the left arm region 54a and the right arm region 54b in pair. The left arm region 54a and the right arm region 54b obliquely project upward from the rear end of the base member 52 so as to open outward relative to each other. A branch portion 58 is formed at a middle portion of the arms, i.e., between the left arm region 54a and the right arm region 54b. The branch portion 58 is formed at a bottom portion of a valley portion formed between the left arm region 54a and the right arm region 54b which are inclined invertedly with respect to each other. The branch portion 58 corresponds to a part of an outer peripheral portion of an enlarged rear end portion in the base member 52.

Both the arms 54a, 54b are provided with hook portions 54c which project on the sides of back surfaces of upper ends thereof to form stepped thick-portions on the tip end side thereof. The second arm member 56 is also provided with a hook portion 56a projecting on the side of a back surface of a lower end thereof.

The base member 52 of the luggage support hook 50 projects forward of the vehicle, and is formed with a bottomed hollow bore extending forward from a rear end surface. A mounting seat surface 52a is formed on a front end surface of the base member 52. A through-hole 52b for allowing the luggage support hook 50 to be mounted to the rear wall of the recess portion 44 through the bolt 60 is formed in the seat surface 52a. The through-hole 52b communicates with the bottomed hollow bore.

Next, referring to FIGS. 8 and 9, various manners of hooking the hanging strap to the luggage support hook will be explained.

FIG. 8A is a front view of the luggage support hook. FIG. 8B is a sectional view taken along a line 8-8 in FIG. 8A. FIG. 9A is a front view of the luggage support hook. FIG. 9B is a sectional view taken along a line 9-9 in FIG. 9A.

While hanging straps in various forms are thought out as the hanging straps of various articles to be hung, the hanging strap in the illustrative embodiment will be explained as a type of a hanging strap which is attached at both ends of one hanging strap 71 to the body portion 72 of the article to be hung, and formed in a loop-shape. As the body portion 72, there is a body portion, which is relatively hard and whose shape is easy to be maintained, such as a bag, or there is a body portion (a storage unit except a hanging strap) easy to be deformed, such as a shopping bag. The present invention can be applied to either of them.

Namely, the hanging strap 71 which extends upward from the body portion 72 of the article to be hung is folded back at a middle portion thereof to exhibit a top portion T. In the embodiment shown in FIGS. 8A and 8B, both the arms 54a, 54b of the luggage support hook 50, which are symmetric in the left and right direction, and the base member 52 are used.

The top portion T of the hanging strap 71 is firstly applied onto a bottom surface of the base member 52 of the luggage support hook 50, and both side portions of the hanging strap are routed upward, whereby the hanging strap is wound around both sides of the base member 52. The two hanging straps 71, 71 on both the sides are put together above the base member 52, passed through the branch portion 58 from back surface sides of both the first arms 54a, 54b, led toward a surface side of the luggage support hook 50 (a front side, hereinafter the same), and hung down from the surface side.

In this manner, after the back-folded top portion T of the hanging strap 71 is wound around an outer periphery of the base member 52 of the luggage support hook 50 from the downward direction, the two hanging straps 71 (provided by folding the single hanging strap 71 in two) are put together and passed through the branch portion 58, whereby a center portion is tightened so as not to spread in the left and right direction. In this condition, the two hanging straps are routed downward from the branch portion 58, whereby the hanging strap can be adjusted to a suitable length without creating looseness therein.

In addition, the body portion 72 of the article to be hung is hung down from the branch portion 58, whereby the load of the body portion 72 is exerted downward and the tensioned state of the hanging strap 71 is thus maintained, so that the article to be hung can be hooked in a reliable and stable state. Moreover, the hanging strap 71 can be wound around the base member 52 and the left and right arms 54a, 54b many times until it is brought to a suitable length, so that the suitable length can be securely realized.

Moreover, the branch portion 58 between the first arms 54a, 54b is positioned rearward of the opening rear end edge 43a of the storage unit 42 (FIG. 2). Therefore, the article 70 to be hung is hung by causing the hanging strap hooked to the plurality of the first arms 54a, 54b to be passed through the branch portion 58, so that it can be prevented from interfering with the storage unit 42.

In another embodiment which is shown in FIGS. 9A and 9B, top portions T of back-folded hanging straps 71, 71 of two articles 70, 70 to be hung are separately hooked to the first arms 54a, 54b, respectively, which are symmetric in the left and right direction. The two articles 70 to be hung which are hooked to the first arms 54a, 54b, respectively, are separated from each other in the left and right direction and hung down (FIG. 4).

Accordingly, the hanging straps 71, 71 of the two articles to be hung are hooked to the first arms 54a, 54b, respectively, which project in a branch-shape and are symmetric in the left and right direction, whereby the articles to be hung can be separated on the left and right sides so as to escape from the location immediately above the floor tunnel 34, and can be hung down in a well-balanced way. It is reasonable to enable winding of the respective hanging straps 71, 71 around the first arms 54a, 54b many times at this time, to thereby bring the hanging straps to suitable lengths.

Additionally, the manner of hooking the hanging strap 71 of the article to be hung to the luggage support hook 50 is not limited to the above-mentioned manners, and various hooking manners can be though out according to the structure of the luggage support hook 50.

In other words, the luggage support hook 50 can be configured such that the first arm member thereof projects radially from the rear end of the base member 52 as the base member and the second arm member projects radially from a position different from the first arm member.

Therefore, it is possible to increase and decrease the number of the winding of the hanging strap around the plurality of the arm portions of the luggage support hook as the hooking manner, when the top portion T of the hanging strap 71 of the article to be hung is hooked to the luggage support hook 50. Thereby, the length of the hanging strap 71 can be easily adjusted.

Moreover, the second arm member of the luggage support hook 50 can also be configured such that it projects from the rear end of the base member in the opposite direction to the first arm member.

By configuring in this manner, due to a radial angle between the first arm member and the second arm member which project in the opposite direction to the base member 52, the arm portions around which the top portion T of the hanging strap 71 is to be twined can be suitably selected. Thus, after the top portion T is hooked to the selected arm portion, the hanging strap 71 is folded back several times according to the number of the arm portions around which the hanging strap 71 is twined, to thereby make it possible to easily adjust the length of the hanging strap 71.

Moreover, the first arm member and the second arm member can be configured such that they project in the upward and downward direction from the rear of the base member 52.

Therefore, the folded top portion T of the hanging strap can be not only hooked to the arm portion facing at least upward, but also the arm portion facing downward. Therefore, the two hanging straps 71 from the top portion T which is hooked to any of the arm portions can be hung in a state where they are put together and twined around the upper and lower arm portions, thus making it possible adjust the length according to the number of twining.

Moreover, the branch portion 58 of the first arm member 54 which is formed between the plurality of the arms can be configured such that it is located rearward of the rear wall 43 of the storage unit 42.

Accordingly, regardless of the manner of hooking the hanging strap 71 of the article to be hung, the hanging strap 71 which is hooked to the plurality of the arms of the first arm member 54 allows the article to be hung down through the branch portion 58, whereby interference with the storage unit 42 can be prevented.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a two-wheeled vehicle having a vehicle body comprising a leg shield including a wall portion extending substantially vertically upwardly, and a floor portion provided below the wall portion, the improvement comprising a luggage support hook for the vehicle, the luggage support hook being attached to the vehicle body, said luggage support hook comprising:
 a base member attached to the wall portion of the leg shield, the base member having a longitudinal axis;
 a first arm member projecting substantially radially outwardly from the base member; and
 a second arm member projecting substantially radially outwardly from the base member at a position different from the first arm member.

2. The luggage support hook for the vehicle according to claim 1, wherein the second arm member is configured so as to project from a rear end of the base member in a substantially opposite direction from a direction of projection of the first arm member.

3. The luggage support hook for the vehicle according to claim 2, wherein the first arm member and the second arm member are configured so as to project in upward and downward directions, respectively.

4. The luggage support hook for the vehicle according to claim 3, wherein the first arm member includes a plurality of upward projecting arms; and the second arm member is configured so as to project downward.

5. The luggage support hook for the vehicle according to claim 3, wherein the vehicle body further comprises a seat on which a rider sits;
 wherein said leg shield is arranged forward of the rider's leg occupying space formed in front of the seat; and
 wherein a storage unit is formed on a rear surface of the leg shield below the luggage support hook.

6. The luggage support hook for the vehicle according to claim 4, wherein the vehicle body further comprises a seat on which a rider sits;
 wherein said leg shield is arranged forward of the rider's leg occupying space formed in front of the seat; and
 wherein a storage unit is formed on a rear surface of the leg shield below the luggage support hook.

7. The luggage support hook for the vehicle according to claim 1, wherein the vehicle body further comprises a seat on which a rider sits;
 wherein said leg shield is arranged forward of the rider's leg occupying space formed in front of the seat; and
 wherein a storage unit is formed on a rear surface of the leg shield below the luggage support hook.

8. The luggage support hook for the vehicle according to claim 5, wherein the storage unit includes a rear wall; and
 the first arm member includes:
  a plurality of upward projecting arms, and
  a branch portion formed between the plurality of arms positioned rearward of the rear wall of the storage unit.

9. The luggage support hook for the vehicle according to claim 5, wherein the second arm member is projected downward from the base member, and a lower end portion of the second arm member is positioned forward of a rear end edge of the storage unit.

10. The luggage support hook for the vehicle according to claim 8, wherein the second arm member is projected downward from the base member, and a lower end portion of the second arm member is positioned forward of the rear end edge of the storage unit.

11. The luggage support hook for the vehicle according to claim 9, wherein the storage unit includes a rear wall formed facing in a rearward and upward direction; and wherein the second arm member is formed so as to project in a forward and downward direction from the base member.

12. The luggage support hook for the vehicle according to claim 1, wherein:
 the leg shield includes a tunnel portion; and
 the first arm member includes two arms which project in a branch-shape in upward and left and right directions from a rear end of the base member attached to an upper portion of the tunnel portion, and are symmetric in a left and right direction.

13. A scooter-type motorcycle comprising
 a vehicle frame;
 a head pipe connected at a front end portion of said vehicle frame, said head pipe having a boss formed thereon;
 a front cover for covering the head pipe at a front portion thereof;
 a substantially L-shaped leg shield mounted on the vehicle frame, said leg shield having a bent portion formed at a middle portion thereof in an upward/downward direction; wherein an upwardly extending portion of said leg shield covers a rear portion of the hear pipe;
 a storage unit formed on the leg shield; and
 a luggage support hook arranged above the storage unit;
 wherein said luggage support hook comprises
 a cylindrical base member attached to the head pipe;
 a first arm member projecting radially from the base member, and
 a second arm member projecting radially from the base member at position different from the first arm member; and
 wherein said luggage support hook and the storage unit are arranged at a position forwardly of a knee and leg occupying space formed between the head pipe and a seat of the vehicle such that during operation of the motorcycle, contact of knees and legs of an operator with said luggage support hook and the storage unit is prevented.

14. A scooter-type motorcycle according to claim 13, wherein the second arm member projects from a rear end of the base member in an opposite direction to the first arm member.

15. A scooter-type motorcycle according to claim 14, wherein the first arm member and the second arm member are configured to project in upward and downward directions, respectively.

16. A scooter-type motorcycle according to claim 15, wherein the first arm member includes a pair of upward projecting arms arranged in V-shape.

17. A scooter-type motorcycle comprising
 a vehicle frame;
 a head pipe connected at a front end portion of said vehicle frame, said head pipe having a boss formed thereon;
 a leg shield mounted on the vehicle frame, and configured to cover a rear portion of the head pipe;
 a storage unit formed on the leg shield, said storage unit including a rear wall; and
 a luggage support hook arranged above the storage unit;
 wherein:
 said luggage support hook comprises
 a base member attached to the head pipe;

a first arm member projecting radially from the base member, said first arm member comprising a pair of arms arranged in a V-shape; and a second arm member projecting radially from the base member at position different from the first arm member;

wherein a vertical line passing through a point corresponding to a valley portion of the V-shape arms passes rearwardly of a rear end of the rear wall of the storage unit; and wherein a vertical line passing through a connection portion between the cylindrical base member and the second arm portion passes forwardly of the rear end of the rear wall of the storage unit.

18. A scooter-type motorcycle according to claim 17, wherein a lower end portion of the second arm member is arranged forwardly of the rear end of the rear wall of the storage unit.

19. A scooter-type motorcycle according to claim 17, wherein the rear wall of the storage unit is formed rearward and obliquely upward direction of the second arm member; and the second arm member arranged to project in a forward and downward direction and obliquely descend from the base member.

* * * * *